(12) United States Patent
Park

(10) Patent No.: US 7,450,978 B2
(45) Date of Patent: Nov. 11, 2008

(54) SLIDING/FOLDING-TYPE PORTABLE TERMINAL

(75) Inventor: Jin-Seok Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 525 days.

(21) Appl. No.: 11/330,753

(22) Filed: Jan. 12, 2006

(65) Prior Publication Data

US 2006/0183369 A1    Aug. 17, 2006

(30) Foreign Application Priority Data

Jan. 12, 2005    (KR) .................. 10-2005-0002903

(51) Int. Cl.
*H04M 1/00* (2006.01)

(52) U.S. Cl. ............... 455/575.3; 455/575.4; 455/575.1; 455/90.3

(58) Field of Classification Search ............. 455/575.3, 455/575.4, 575.1, 90.3, 575.8; D14/138
See application file for complete search history.

(56) References Cited

U.S. PATENT DOCUMENTS

| | | | |
|---|---|---|---|
| 6,681,125 B1 * | 1/2004 | Woo | 455/556.1 |
| 2002/0057794 A1 * | 5/2002 | Kaschke | 379/433.01 |
| 2002/0104769 A1 * | 8/2002 | Kim et al. | 206/320 |
| 2004/0053649 A1 * | 3/2004 | Sun | 455/575.1 |
| 2004/0116166 A1 * | 6/2004 | Makishima | 455/575.1 |
| 2004/0204001 A1 * | 10/2004 | Chen et al. | 455/550.1 |
| 2004/0224732 A1 * | 11/2004 | Lee et al. | 455/575.3 |
| 2005/0107137 A1 * | 5/2005 | Byun et al. | 455/575.1 |
| 2006/0003708 A1 * | 1/2006 | Jantti et al. | 455/90.3 |
| 2006/0210059 A1 * | 9/2006 | Kosugi | 379/433.13 |
| 2007/0093140 A1 * | 4/2007 | Begic et al. | 439/676 |

FOREIGN PATENT DOCUMENTS

KR    10-2006-0010333    2/2006

* cited by examiner

*Primary Examiner*—Dwayne D Bost
*Assistant Examiner*—Huy D. Nguyen
(74) *Attorney, Agent, or Firm*—The Farrell Law Firm, PC

(57) ABSTRACT

A sliding/folding-type portable terminal includes a first housing; a second housing coupled to the first housing in such a manner that it can rotate in a direction moving away from a state facing the first housing or approaching it; a third housing coupled to the second housing in such a manner that it can linearly reciprocate; and a first elastic means adapted to provide a rotation force for rotating the second housing away from the first housing, wherein the third housing is adapted to engage the first housing and restrict the rotation of the second housing, when the second housing faces the first housing, and to be released from the first housing upon linearly traveling on the second housing.

19 Claims, 6 Drawing Sheets

SLIDING/FOLDING-TYPE PORTABLE TERMINAL

PRIORITY

This application claims priority to an application entitled "Sliding/Folding-type Portable Terminal" filed with the Korean Intellectual Property Office on Jan. 12, 2005 and assigned Ser. No. 2005-2903, the contents of which are incorporated herein by reference.

BACKGROUND OF THE INVENTION

1. Field of the Invention

The present invention relates to a portable terminal, and more particularly to a sliding/folding-type portable terminal that can be opened in a convenient manner.

2. Description of the Related Art

In general, a portable communication terminal provides electrical communication between users or between a user and a service provider. The terminal may provide voice communication, short sentence message, multimedia services, and entertainment.

Portable terminals are classified according to their appearance into bar-type terminals having a transmitter unit, a receiver unit, and a data input/output device positioned on a single housing; flip-type terminals having a transmitter unit, a receiver unit, and a data input/output device positioned on a single housing, as well as a flip cover attached thereto to expose/hide a data input device such as a keypad; and folder-type terminals having a transmitter unit, a receiver unit, and a data input/output device respectively positioned on a suitable one of a pair of foldable housings. Recently, sliding-type, popup-type, and swing-type terminals have appeared and been commercialized in according to consumer demand. These variously portable terminals can be easily understood by those skilled in the art.

Among portable terminals, folder-type terminals are the most preferred terminals due to their comparatively excellent portability and user convenience. Sliding-type terminals have gained popularity as preferred terminals.

One of the commonalities between folder-type and sliding-type terminals is the fact that a pair of housings are folded on each other in standby mode and one of housings is moved relative to the other to be unfolded. In addition, input and output devices including a keypad, a display device, and transmitter and receiver units, as well as circuit devices for communication function, are properly distributed and positioned on the housings.

Therefore, folder-type or sliding-type terminals are advantageous for their compactness and suitable for portability improvement. Furthermore, they can be more variously modified than other types of terminals to position input and output devices as desired. As such, folder-type or sliding-type terminals have the advantages of improved user convenience and diversified terminal design.

In the case of a folder-type terminal, however, a user must manually rotate a housing 30°, at minimum, or 90°, at maximum, to open the terminal. In the case of a sliding-type terminal, a user must likewise manually slide a housing through a part or all of the movement range of the housing. Furthermore, the display device of a sliding-type terminal is always exposed and the transparent cover protecting the display device may be damaged (e.g., scratched) or fractured by an external impact.

SUMMARY OF THE INVENTION

Accordingly, the present invention has been made to solve the above-mentioned problems occurring in the prior art, and an object of the present invention is to provide a sliding/folding-type portable terminal which can be opened with a minimum operation for convenient use.

Another object of the present invention is to provide a sliding/folding-type portable terminal having minimized exposure of input and output devices, including a keypad and a display device, when the terminal is carried (i.e., in a standby mode).

To accomplish these objects, there is provided a sliding/folding-type portable terminal including a first housing; a second housing coupled to the first housing in such a manner that it can rotate in a direction moving away from a state facing the first housing or approaching it; a third housing coupled to the second housing in such a manner that it can linearly reciprocate; and a first elastic means adapted to provide a rotation force for rotating the second housing away from the first housing, wherein the third housing is adapted to engage the first housing and restrict the rotation of the second housing, when the second housing faces the first housing, and to be released from the first housing upon linearly traveling on the second housing.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Figure 1:
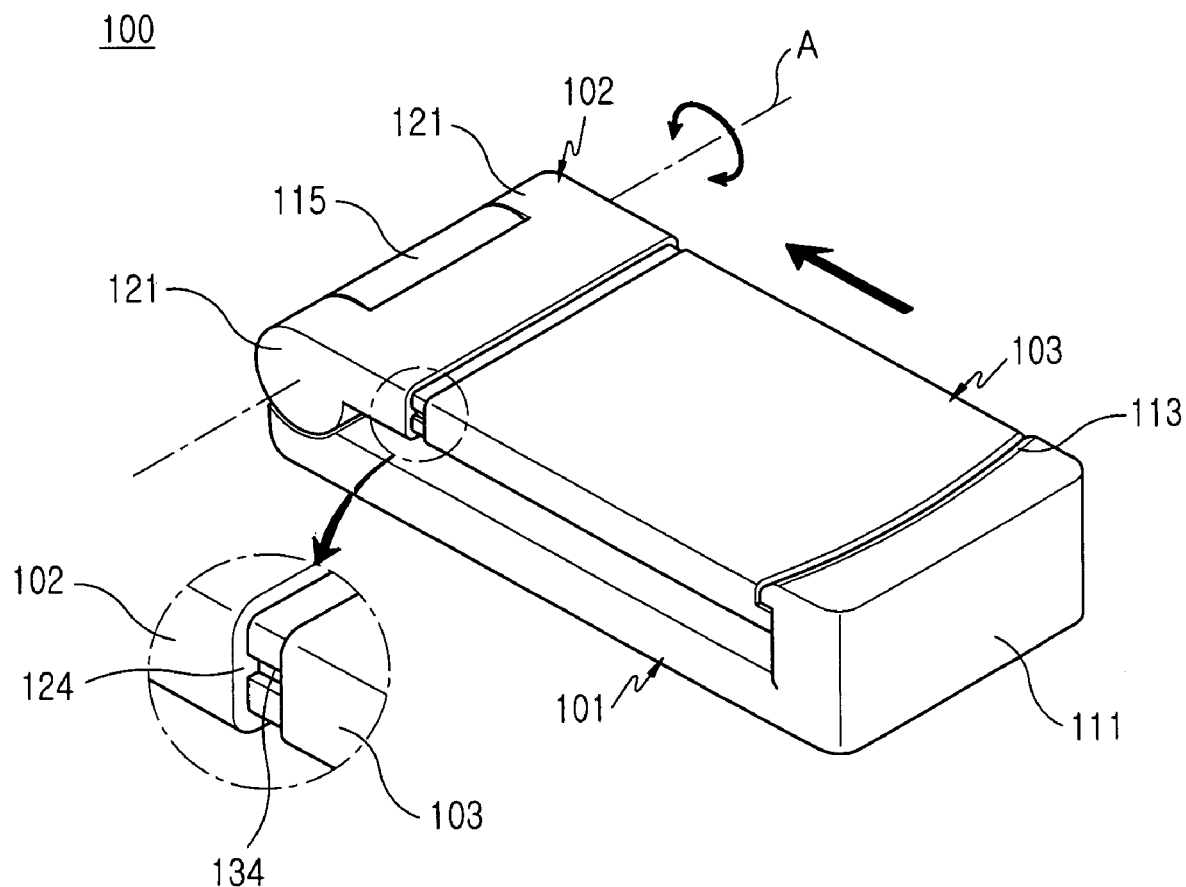
FIG. 1 is a perspective view showing a sliding/folding-type portable terminal according to a first embodiment of the present invention.

As shown in FIG. 1, a sliding/folding-type portable terminal 100 according to a preferred embodiment of the present invention includes a first housing 101, a second housing 102 rotatably coupled to the first housing 101, and a third housing 103 coupled to the second housing 102 in such a manner that the third housing linearly reciprocate.

The first housing 101 has a center hinge arm 115 formed on an end thereof and a locking rib 111 formed on the other end thereof. The center hinge arm 115 and the locking rib 111 protrude upwardly from the front surface of the first housing 101 at a right angle while facing each other. Although not shown in the drawings, a keypad and a transmitter unit are positioned on the front surface of the first housing 101 between the center hinge arm 115 and the locking rib 111.

The locking rib 111 has a locking groove 112 formed on a surface thereof, preferably on the surface facing the center hinge arm 115. The locking groove 112 extends parallel to the center hinge arm 115. The locking rib 111 has a first slant surface 113 formed on the inner end of the upper surface thereof. The first slant surface 113 is slanted in such a manner that, the further away from the front surface of the first housing 101, the more the first surface 113 is spaced from the center hinge arm 115.

The second housing 102 is adapted to rotate away from the first housing 101 about a rotation axis A, which extends through the coupling between the first and second housings 101 and 102. In effect, the second housing 102 rotates about the coupling with respect to the first housing 101. The second housing 102 has a pair of side hinge arms 121 formed on an end thereof while facing each other with a spacing between them.

Figure 2:
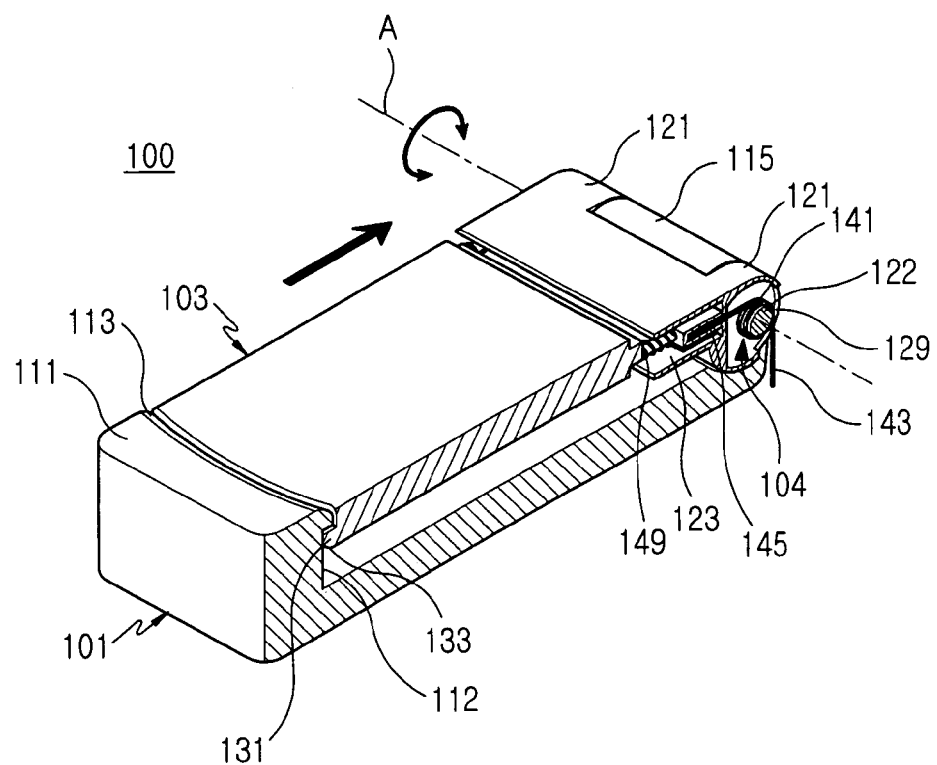
FIG. 2 is a partially-broken perspective view of the sliding/folding-type portable terminal shown in FIG. 1.
Figure 4:
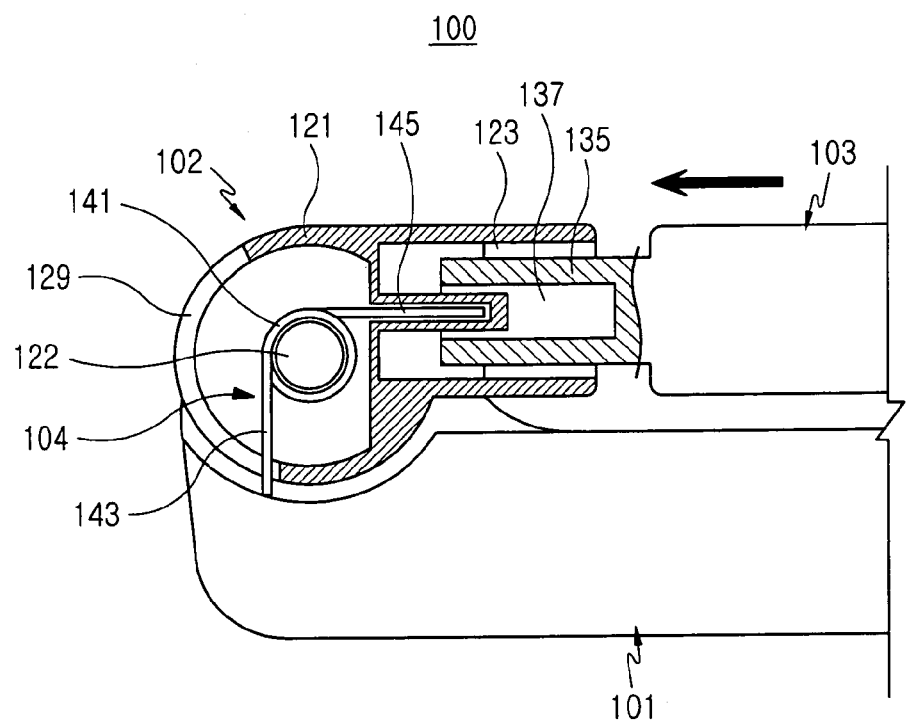
FIG. 4 is a sectional view showing a second part of the sliding/folding-type portable terminal shown in FIG. wherein its second and third housings are coupled to each other.

The side hinge arms 121 are rotatably coupled to both ends of the center hinge arm 115. Particularly, the center hinge arm 115 is rotatably coupled between the side hinge arms 121 to provide the second housing 102 with to ability to rotate about the rotation axis A. Referring to FIGS. 2 and 4, it is clear that the terminal 100 is provided with a support shaft 122 to connect the side hinge arms 121 to the center hinge arm 115. Specifically, the support shaft 122 extends along the rotation axis A and rotatably connects the side hinge arms 121 to the center hinge arm 115.

Figure 5:
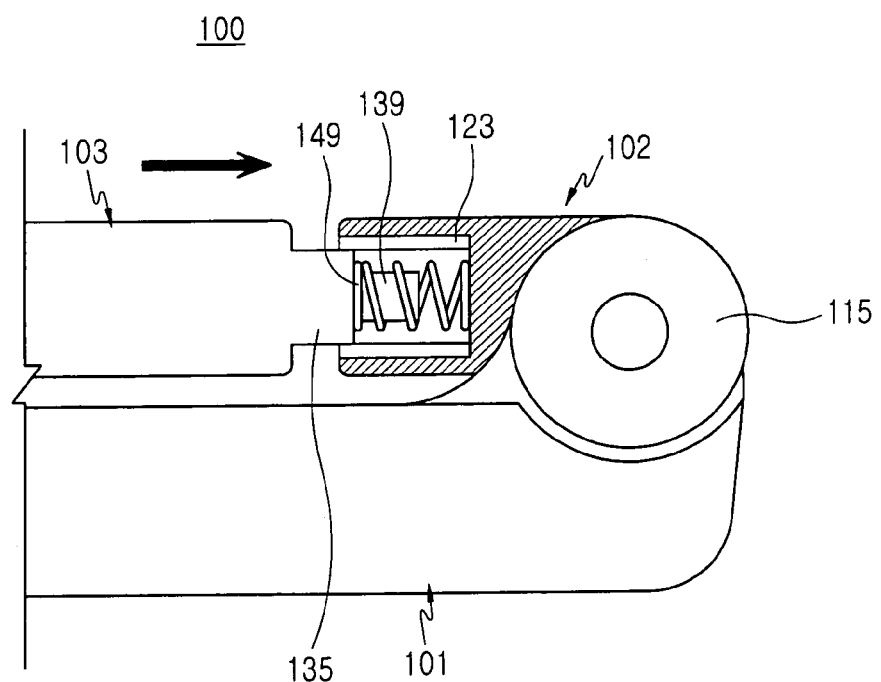
FIG. 5 is a sectional view showing a third part of the sliding/folding-type portable terminal shown in FIG. 1 wherein its second and third housings are coupled to each other.

As shown in FIGS. 2, 4, and 5, the second housing 102 has a reception groove 123 formed on an end thereof, which is positioned to face the locking rib 111 when the second housing 102 faces the first housing 101. The reception groove 123 has at least one hook 124 formed on an open end thereof while protruding into the inner surface thereof.

The second housing 102 has a first elastic means 104 positioned in at least one of the side hinge arms 121, which provides a rotation force to rotate the second housing 102 away from the first housing 101.

The first elastic means 104 includes a coil 141 wound about the rotation axis A, particularly around the outer peripheral surface of the support shaft 122, and first and second free ends 143 and 145 extending from both ends of the coil 141. The first free end 143 protrudes to the outer peripheral surface of the side hinge arm 121 and is fixed to the first housing 101. The second free end 145 extends to the interior of the second housing 102 and is positioned in the reception groove 123. The second free end 145 may be positioned in the reception groove 124 while being surrounded by an injection-molded member of the second housing 102.

The first elastic means 104 provides an elastic force for rotating the second housing 102 away from the first housing 101, when the second housing 102 faces the first housing 101. A space provides for movement of the first free end 143, which protrudes to the outer peripheral surface of the second housing 102 and is fixed to the first housing 101, while the second housing 102 rotates. Therefore, the side hinge arm 121 has a slit 129 formed thereon while extending along the circumferential direction of the outer peripheral surface thereof. The span of the slit 129 corresponds to the range of rotation angle of the second housing 102, which may be variously set in the range of 150-180°.

The first elastic means 104 may also be positioned in the center hinge arm 115. Particularly, the coil 141 and the first free end 143 of the first elastic means 104 may be positioned in the center hinge arm 115 and the second free end 145 may protrude to the outer peripheral surface of the center hinge arm 115 to be fixed to the second housing 102. The center hinge arm 115 preferably has a slit formed on the outer peripheral surface thereof to allow the second free end 145 to move so that it can rotate together with the second housing 102.

The third housing 103 has an end 135 thereof received in the reception groove 123 to be coupled to the second housing 102 in such a manner that it can linearly reciprocate thereon. The third housing 103 has output devices (not shown) including a display device and a receiver unit positioned on a surface thereof facing the first housing 101. The third housing 103 rotates together with the second housing 102 while being coupled thereto to expose/hide the keypad, the display device, and the transmitter and receiver units of the terminal 100.

The third housing 103 has a guide groove 134 formed on the outer peripheral surface of an end 135 thereof along the direction of the third housing 103 linear movement. The hook 124 of the reception groove 123 of the second housing 102 is positioned in the guide groove 134 to guide the linear reciprocation thereof as the third housing 103 linearly reciprocates. Particularly, the relative position of the hook 124 in the guide groove 134 changes as the third housing 103 moves linearly. The longitudinal span of the guide groove 134 is limited to restrict the range of linear reciprocation of the end 135 of the third housing 103 positioned in the reception groove 123.

A number of hooks 124 may be formed on the open end of the reception groove 123 with a predetermined spacing. A protruding rib may be formed on the inner wall of the open end of the reception groove 123 while extending along the outer peripheral surface thereof, in addition to the hooks 124, and a corresponding groove may be formed on the outer peripheral surface of the end 135 of the third housing 103 to restrict the range of movement of the third housing 103.

The third housing 103 has an avoidance hole 137 formed on the end thereof 135, in which the second free end 145 of the first elastic means 104 is positioned, so that the end 135 can smoothly reciprocate linearly in the reception groove 123 without any interference from the second free end 145.

A second elastic means 149 is positioned in the reception groove 123 and is preferably made up of a compression coil spring. At least two elastic means 149 may be positioned side by side to provide the third housing 103 with an elastic force. The second elastic means 149 has an end thereof supported on the inner wall of the reception groove 123 and the other end thereof supported on an end of the third housing 103. The elastic force from the second elastic means 149 is directed so that the third housing 103 is released from the reception groove 123. The third housing 103 may have a spring shaft 139 formed on an end thereof to prevent the second elastic means 149 from floating in the reception groove 123.

Figure 3:
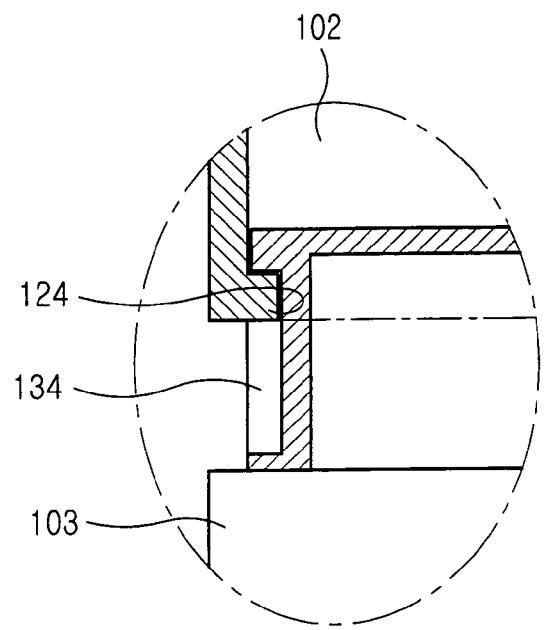
FIG. 3 is a sectional view showing a first part of the sliding/folding-type portable terminal shown in FIG. 1 wherein its second and third housings are coupled to each other.

The hook, 124, the guide groove 134, and the second elastic means 149 are constructed in such a manner that, when no external force is applied to the third housing 103, the elastic force from the second elastic means 149 causes the hook 124 to be retained in a position within the guide groove 134 as shown in FIG. 3. When the third housing 103 is moved into the reception groove 123 by an external force, the elastic force in the second elastic means 149 increases and, when the external force is removed, the elastic force from the second elastic means 149 causes the third housing 103 to move away from the reception groove 123.

The third housing 103 has a locking protrusion 131 formed on the other end thereof in a shape corresponding to the locking groove 112 of the first housing 101. When the second and third housings 102 and 103 are fastened to the front surface of the first housing 101, the locking protrusion 131 engages the locking groove 112 and restricts the rotation of the second and third housings 102 and 103.

The extent of protrusion of the locking protrusion 131 from the other end of the third housing 103 is set to be smaller than the range of linear reciprocation of the third housing 103. When the third housing 103 linearly travels while the locking protrusion 131 engages the locking groove 112, therefore, the locking protrusion 131 is released form the locking groove 112.

When the locking protrusion 131 is released from the locking groove 112, the second and third housings 102 and 103 are free to rotate. The elastic force from the first elastic means 104 then causes the second and third housings 102 and 103 to rotate away from the first housing 101.

To close the terminal from an open position, the second or third housing 102 or 103 is rotated toward the first housing 101 about the rotation axis A. The locking protrusion 131 has a second slant surface 133 formed on the lower end thereof, which corresponds to the first slant surface 113, so that, when the locking protrusion 131 contacts the upper end of the locking rib 111, the third housing 103 linearly travels into the reception groove 123.

Particularly, the contact between the locking protrusion 131 and the upper end of the locking rib 111 corresponds to the contact between the first and second slant surfaces 113 and 133. When the second or third housing 102 or 103 is continuously rotated to be fastened to the fist housing 101, the second slant surface 133 travels along the first slant surface 133 and causes the third housing 103 to travel linearly.

When the end 135 of the third housing 103 is fully received in the reception groove 123 and the second and third housings 102 and 103 are rotated and fully fastened to the first housing 101, the locking protrusion 131 faces the locking groove 112. The elastic force from the second elastic means 149 causes the third housing 103 to move away from the reception groove 123 and the locking protrusion 131 to again engage the locking groove 112.

As the locking protrusion 131 engages the locking groove 112, the terminal 100 is maintained in a closed, folded position in spite of the rotation force from the first elastic means 104.

Figure 6:
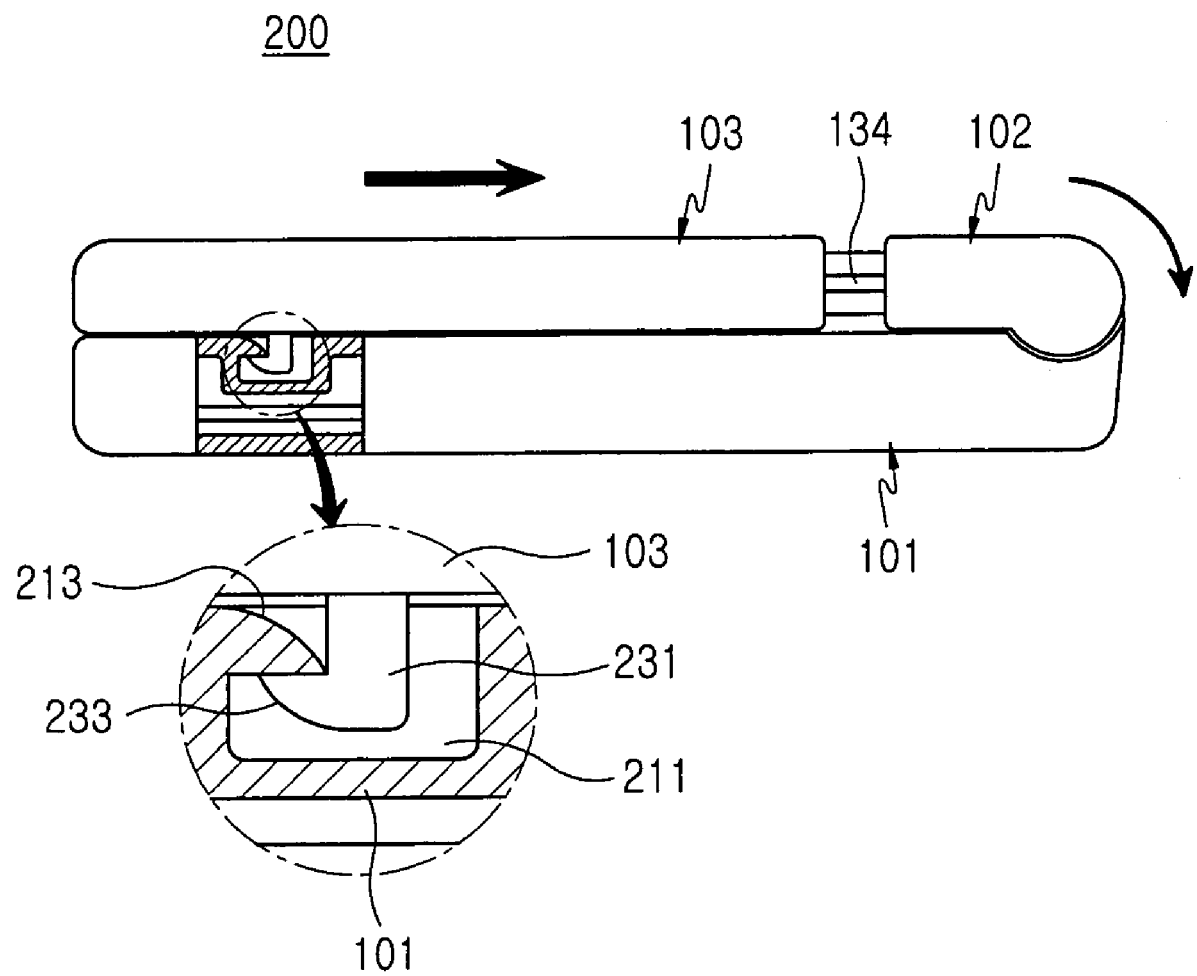
FIG. 6 is a partially-broken lateral view showing a sliding/folding-type portable terminal according to a second embodiment of the present invention.

FIG. 6 is a partially-broken lateral view showing a sliding/folding-type portable terminal according to a second embodiment of the present invention.

In the following description of the sliding/folding-type portable terminal according to the second embodiment of the present invention, the same components as in the previous embodiment are given the same reference numerals and so a repeated description thereof is omitted.

As shown in FIG. 6, a sliding/folding-type portable terminal 200 according to the second preferred embodiment of the present invention includes a first housing 101, a second housing 102 rotatably coupled to the first housing 101, and a third housing 103 coupled to the second housing 102 in such a manner that the third housing 103 can linearly reciprocate.

The first housing 101 has a locking groove 211 recessed from a surface thereof to a predetermined depth. The locking groove 211 is partially closed on a surface of the first housing 101 and extends a predetermined distance along the direction of linear movement of the third housing 103. The first housing 101 has a first slant surface 213 formed on a surface thereof, which is connected to the locking groove 211.

The third housing 103 has a locking hook 231 formed on a surface thereof facing the first housing 101. The locking hook 231 protrudes from a surface of the third housing 103 with an end thereof extending along the direction of linear movement of the third housing 103. The locking hook 231 has a second slant surface 233 formed on the end thereof, which corresponds to the first slant surface 213.

When the second housing 102 is fastened to the first housing 101 while facing it, the locking hook 231 engages the locking groove 211 and restricts the rotation of the second and third housings 102 and 103. As the third housing 103 linearly travels and the locking hook 231 is released from the locking groove 211, the elastic force from the first elastic means 104 causes the second and third housings 102 and 103 to rotate away from the first housing 101.

When the second and third housings 102 and 103 again rotate to fasten to and face the first housing 101, the first and second slant surfaces 213 and 233 contact each other. When the second and third housings 102 and 103 are forced against the first housing 101 while the first and second slant surfaces 213 and 233 contact each other, the second slant surface 233 travels along the first slant surface 213 and the third housing 103 is moved into the reception groove 123.

The locking hook 231 can be positioned in the locking groove 211 as the third housing 103 is moved into the reception groove 123. An end of the locking hook 231 engages the interior of the locking groove 211, as the locking hook 231 is positioned in the locking groove 211, and restricts the rotation of the second and third housings 102 and 103.

Figure 7:
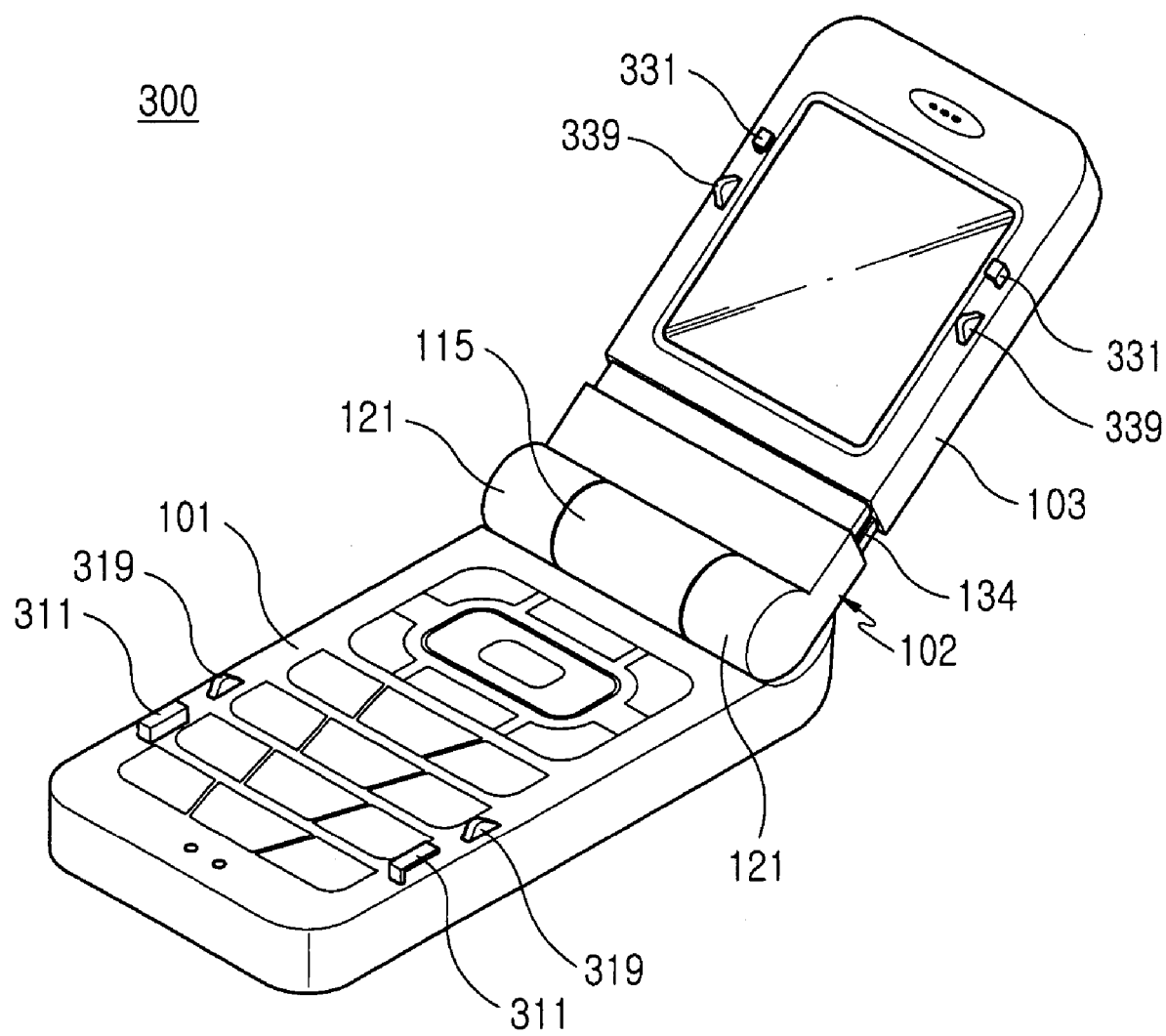
FIG. 7 is a perspective view showing a sliding/folding-type portable terminal according to a third embodiment of the present invention.
Figure 8:
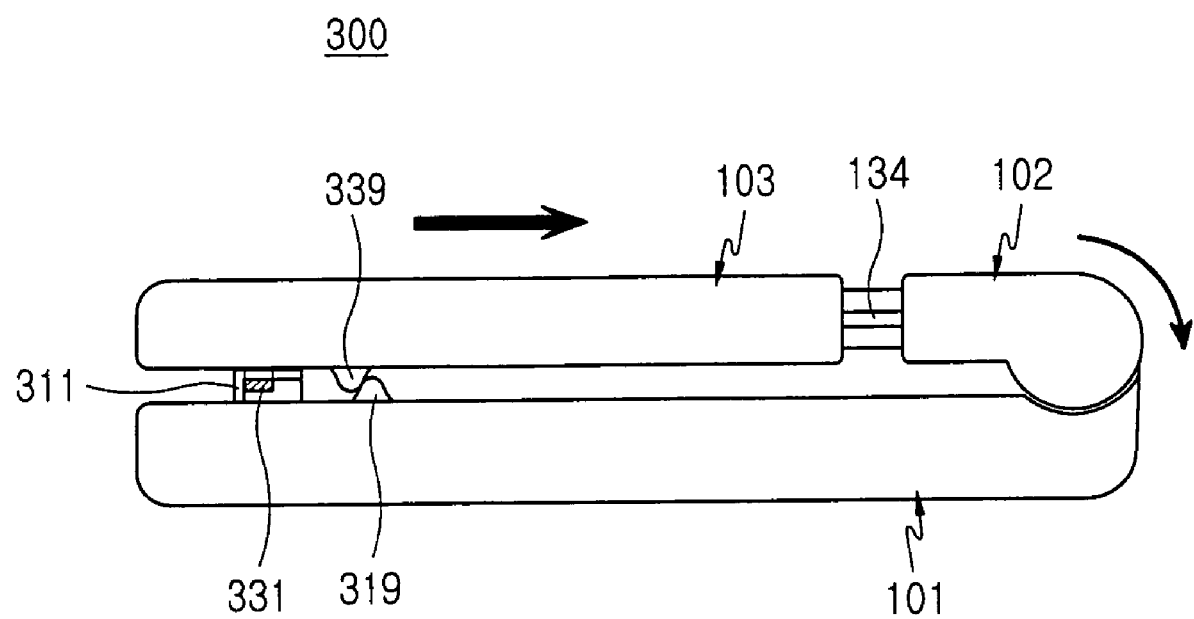
FIG. 8 is a lateral view of the sliding/folding-type portable terminal shown in FIG. 7.

FIGS. 7 and 8 show a sliding/folding-type portable terminal 300 according to a third embodiment of the present invention.

In the following description of the sliding/folding-type portable terminal according to the third embodiment of the present invention, the same components as in the previous embodiments are given the same reference numerals and so their repeated description is omitted.

As shown in FIGS. 7 and 8, a sliding/folding-type portable terminal 300 according to a third preferred embodiment of the present invention includes a first housing 101, a second housing 102 rotatably coupled to the first housing 101, and a third housing 103 coupled to the second housing 102 so that the third housing 103 can linearly reciprocate.

The terminal 300 is provided with a guide rib 311 and a guide protrusion 331 to restrict the rotation of the second and third housings 102 and 103 while facing the first housing 101.

The guide rib 311 protrudes from a surface of the first housing 101 with an end thereof bent to face a surface of the first housing 101 and extends along the direction of linear movement of the third housing 103.

The guide protrusion 331 protrudes from a surface of the third housing 103 with an end thereof bent to face the third housing 103.

The guide rib 311 and the guide protrusion 331 engage each other, when the second and third housings 102 and 103 face the first housing 101, and restrict the rotation of the second and third housings 102 and 103. The guide protrusion 331 is released from the guide rib 311 as the third housing 103 travels and allows the second and third housings 102 and 103 to rotate.

When the end of the guide rib 311 is bent toward the lateral end of the first housing 101, the end of the guide protrusion 331 is bent toward the interior of the second housing 102. When the end of the guide rib 311 is bent toward the interior of the first housing 101, the end of the guide protrusion 331 is similarly bent toward the lateral end of the second housing 102.

The guide rib 311 and the guide protrusion 331 are preferably provided with a slant surface to cause the third housing 103 to move linearly when the second and third housings 102 and 103 rotate to close the terminal 300.

When the portable terminal 300 is jarred due to external vibration, the third housing 103 may linearly travel on the second housing 102 and the terminal 300 may be opened unintentionally.

To increase reliability of the product, unwanted movement, or floating of the third housing 103 is restricted. Such restriction may be realized by an elastic force from a second elastic means 149 for providing the third housing 103 with an elastic means. In the present embodiment, a pair of stopper protrusions 319 and 339 are provided to restrict unwanted floating of the third housing 103.

Referring to FIG. 8, the first and third housings 101 and 103 have first and second stopper protrusions 319 and 339 formed thereon, respectively, to restrict the floating of the third housing 103. When the terminal 300 is closed and the second and third housings 102 and 103 face the first housing 101, the guide protrusion 331 and the guide rib 311 engage each other and the first and second stopper protrusions 319 and 339 contact each other. For linear movement of the third housing 103, the third stopper protrusion 339 passes through the first stopper protrusion 319. In this way, the linear movement of the third housing 103 is restricted until a sufficient external force is applied thereto.

Such a construction of the first and second stopper protrusions 319 and 339 is preferably applied to the previous embodiments to guarantee the reliability of the product. Although the first and second stopper protrusions 319 and 339 are positioned adjacent to the guide rib 311 and the guide protrusion 331, they may be arbitrarily positioned as long as the linear movement of the third housing 103 is restricted when the second and third housings 102 and 103 face the first housing 101.

At least one of the first and second stopper protrusions 319 and 339 may be adapted to protrude to and retract from the first and third housings 101 and 103, respectively, to minimize deformation of the contour of the first, second, and third housings 101, 102, and 103 of the terminal 300 when the first and second stopper protrusions 319 and 339 are configured. Such adaptation can be realized by an elastic means, such as a compression coil spring, positioned on the first or third housing 101 or 103, as in the case of the linear reciprocation of the third housing 103 on the second housing 102.

When only the first stopper protrusion 319 is adapted to protrude and retract from the first housing 101, as when for example, the second stopper 339 pushes through the first stopper protrusion 319 as the third housing 103 linearly travels while the guide rib 311 and the guide protrusion 331 engage each other, the first stopper 319 then retracts into the first housing 101 and allows the second stopper protrusion 339 to pass easily.

As mentioned above, the sliding/folding-type portable terminal according to the present invention can be opened in a convenient manner by linearly moving the third housing to unlock it when the first and third housings engage each other. When the third housing is linearly moved and unlocked, furthermore, the second housing is provided with a predetermined elastic force and rotates away from the first housing to open the terminal. As such, the inventive terminal can be opened in a remarkably simple manner compared with conventional folder-type or sliding-type terminals. When the terminal is carried (i.e., in a standby mode), the input and output devices are covered and less likely to be damaged (e.g., scratched).

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding/folding-type portable terminal, comprising:
a first housing;
a second housing coupled to the first housing in such a manner that it can rotate with respect to the first housing;
a third housing coupled to the second housing in such a manner that it can linearly reciprocate; and
a first elastic means adapted to provide a rotation force for rotating the second housing away from the first housing, wherein
the third housing is adapted to engage the first housing and restrict the rotation of the second housing, when the second housing faces the first housing, and to be released from the first housing upon linearly traveling on the second housing.

2. The sliding/folding-type portable terminal as claimed in claim 1, wherein the first elastic means comprises a coil portion wound about a rotation axis of the second housing; a first free end extending from the coil portion with an end thereof fixed on the first housing; and a second free end extending from the coil portion with an end thereof fixed on the second housing.

3. The sliding/folding-type portable terminal as claimed in claim 1, wherein the first housing has a center hinge arm formed on an end thereof, the second housing has a pair of side hinge arms formed on an end thereof while facing each other, and the center hinge arm is rotatably coupled between the side hinge arms.

4. The sliding/folding-type portable terminal as claimed in claim 3, wherein the first elastic means is received in at least one of the side hinge arms.

5. The sliding/folding-type portable terminal as claimed in claim 3, wherein the first elastic means comprises a coil portion received in at least one of the side hinge arms and wound about a rotation axis of the second housing; a first free end extending from the coil portion with an end thereof fixed on the first housing; and a second free end extending from the coil portion with an end thereof fixed on the second housing.

6. The sliding/folding-type portable terminal as claimed in claim 5, wherein said terminal further comprises a slit extending along the circumferential direction of the outer peripheral surface of the side hinge arms and the first free end travels in the slit along the circumferential direction of the side hinge arms as the second housing rotates.

7. The sliding/folding-type portable terminal as claimed in claim 3, wherein the first elastic means comprises a coil portion received in the center hinge arm and wound about a rotation axis of the second housing; a first free end extending from the coil portion with an end thereof fixed on the first housing; and a second free end extending from the coil portion with an end thereof fixed on the second housing.

8. The sliding/folding-type portable terminal as claimed in claim 1, wherein said terminal further comprises a reception groove formed on the second housing to receive an end of the third housing in such a manner that the end of the third housing linearly reciprocates in the reception groove.

9. The sliding/folding-type portable terminal as claimed in claim 8, wherein said terminal further comprises a second elastic means received in the reception groove with an end thereof supported on the inner wall of the reception groove and the other end thereof supported on an end of the third housing.

10. The sliding/folding-type portable terminal as claimed in claim 9, wherein at least two second elastic means are positioned side by side.

11. The sliding/folding-type portable terminal as claimed in claim 9, wherein the second elastic means provides an elastic force acting in such a direction that the third housing is released from the reception groove.

12. The sliding/folding-type portable terminal as claimed in claim 8, wherein said terminal further comprises at least one hook formed on the open end of the reception groove and a guide groove formed on the outer peripheral surface of the third housing along the linear reciprocation of the third housing to engage the hook, and the hook and the guide groove restrict the range of movement of the third housing.

13. The sliding/folding-type portable terminal as claimed in claim 1, wherein said terminal further comprises a locking groove formed on the first housing and a locking protrusion formed on the third housing and the locking protrusion engages the locking groove, when the second housing faces the first housing, and is released from the locking groove as the third housing travels.

14. The sliding/folding-type portable terminal as claimed in claim 13, wherein the first housing has a locking rib protruding from the front surface of an end thereof, the locking groove is formed on a surface of the locking rib, and the locking protrusion is formed on the other end of the third housing.

15. The sliding/folding-type portable terminal as claimed in claim 14, wherein said terminal further comprises a first slant surface formed on the inner end of the upper surface of the locking rib and a second slant surface formed on an end of the locking protrusion and, when the third housing rotates in a direction approaching the first housing, the first and second slant surfaces contact each other and cause the third housing to linearly travel.

16. The sliding/folding-type portable terminal as claimed in claim 1, wherein said terminal further comprises at least one locking groove formed on a surface of the first housing and a locking hook formed on a surface of the third housing while extending along the linear reciprocation and the locking hook engages the locking groove, when the second housing faces the first housing, and is released from the locking groove as the third housing travels.

17. The sliding/folding-type portable terminal as claimed in claim 16, wherein said terminal further comprises a first slant surface formed on a surface of the first housing and connected to the locking groove and a second slant surface formed on an end of the locking hook and, when the third housing rotates in a direction approaching the first housing, the first and second slant surfaces contact each other and cause the third housing to travel.

18. The sliding/folding-type portable terminal as claimed in claim 1, wherein said terminal further comprises at least one guide rib protruding from a surface of the first housing and extending along the linear reciprocation with an end thereof facing a surface of the first housing and a guide protrusion protruding from a surface of the third housing with an end thereof facing the third housing and the guide protrusion engages the guide rib and restricts the rotation of the second housing, when the second housing faces the first housing, and is released from the guide rib as the third housing linearly travels.

19. The sliding/folding-type portable terminal as claimed in claim 1, wherein said terminal further comprises a first stopper protrusion formed on a surface of the first housing and a third stopper protrusion formed on a surface of the third housing while corresponding to the first stopper protrusion and, when the second housing faces the first housing and the third housing engages the first housing and restricts the rotation of the second housing, the first and third stopper protrusions contact each other and restrict the movement of the third housing.

* * * * *